United States Patent [19]  [11] 3,885,484
Sturgis  [45] May 27, 1975

[54] EXPLOSIVELY ACTUATED COMPRESSED DISC LINE CUTTER

[75] Inventor: Daniel C. Sturgis, Tamaqua, Pa.

[73] Assignee: ICI United States Inc., Wilmington, Del.

[22] Filed: Oct. 23, 1973

[21] Appl. No.: 408,505

[52] U.S. Cl. ............... 83/580; 83/639; 114/221 A
[51] Int. Cl. ............................................. B26d 5/08
[58] Field of Search ........... 83/580, 639; 114/221 A

[56] References Cited
UNITED STATES PATENTS

| | | |
|---|---|---|
| 2,140,214 | 12/1938 | Temple, Jr. .................... 83/580 X |
| 2,140,338 | 12/1938 | Temple, Jr. .................... 83/639 X |
| 2,970,506 | 2/1961 | Temple et al. ..................... 83/639 |
| 3,452,631 | 7/1969 | Brizzolara ...................... 83/639 X |

Primary Examiner—Frank T. Yost

[57] ABSTRACT

A cutting tool is disclosed for use in severing lines and cables, especially those which are constructed from multifilament, low denier polymer resins. An explosively activated piston drives a compressed disc through a segment of a multifilament cable or line, thereby shearing out a small segment thereof.

7 Claims, 10 Drawing Figures

EXPLOSIVELY ACTUATED COMPRESSED DISC LINE CUTTER

The invention relates to an explosively actuated cutting tool and, more particularly, to a cutting tool having an explosive charge which is activated by electrical or mechanical means and which drives a piston to force a tempered compressed metal disc through a segment of line held within its casing.

Explosively actuated cutting devices such as those described in U.S. Pat. Nos. 3,482,484; 3,246,396; 3,523,477; and 2,411,909 are known to the art for use in severing cables, reefing lines and the like. These devices, however, are less efficient in cutting low denier multifilament lines and cables constructed of stretchable plastic resins and those made from multifilament high gauge metal wire because the individual filaments have a tendency to be extruded without shearing in the process. Most prior art devices, to operate effectively, must be used on cables and lines under high tension such that the filaments to be severed are not extruded or caused to bypass the shearing surfaces. An early model having a brazed disc to act as a water seal was sold by applicant and was later found to have problems because the metal in the disc lost hardness at the brazed junction. The cutting tool of the present invention operates effectively on loosely held lines and cables as well as those under tension.

The present invention, generally provides for a cutting tool which comprises a tubular casing, a means to hold a line, a compressed hardened or tempered disc adjacent the line and a slideable piston or punch actuated by an explosive charge or some other means such that the piston drives the compressed disc through a segment of the line to be severed. In operation, the multifilament line is held in the path of a moving disc compressed within the interior walls of the tubular casing, and thereby shears the line in two locations – the intersections of the line with the side walls. The cutting tool, therefore, differs from most in that it severs the line into three segments.

The present invention will become more apparent from the following detailed descriptions taken with regard to the accompanying drawings in which like numerals represent the same elements throughout the several views.

Figure 1:
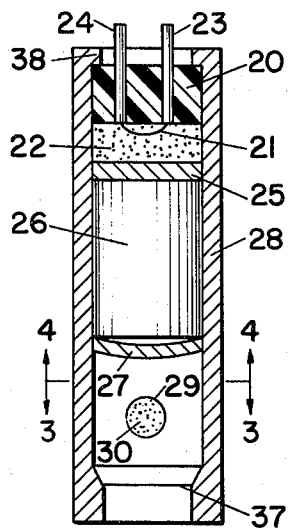
FIG. 1 is a longitudinal midsectional view of one embodiment of the invention wherein a disc is compressed within a cylinder having a uniform interdimension throughout.
Figure 2:
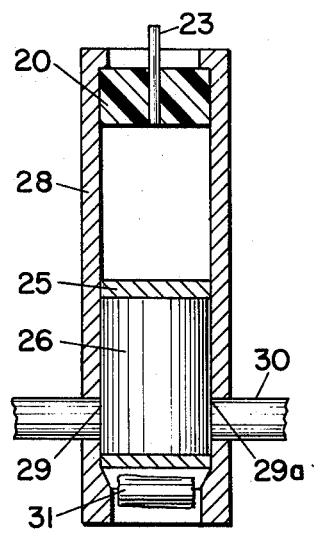
FIG. 2 is a longitudinal midsectional view of the cutting tools shown in FIG. 1 which is rotated 90° about its longitudinal axis, and in which the disc has moved to its final position, having cut the line.
Figure 3:
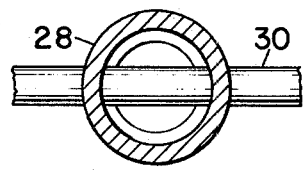
Fig. 3 is a transverse sectional view of the embodiment of FIG. 1 taken along section lines 3—3.
Figure 4:
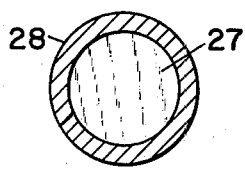
FIG. 4 is a transverse sectional view of FIG. 1 taken through section lines 4—4.

Referring to FIG. 1–4, there is illustrated a cutting tool having a tubular casing 28 formed of any suitable rigid material including, for example, stainless steel, mild steel, brass, or rigid plastic having a uniform interior dimension with inward crimped retaining shoulder 38 and shoulder 37 at each end as a means for retaining interior components. Sealed within the interior of one end is a squib having lead wires 23 and 24 insulated in a nonconductor 20 such as glass or a rigid plastic, said lead wires being interconnected through bridge wire 21 embedded in explosive material 22, which is guarded from exterior dampness by sealing gasket 25 which may be of metal, rubber or plastic. A slideable piston or slug 26 of heavy metal is mounted between said squib and a tempered compressed disc 27 which is compressed to a dish shape within the casing. The disc may be of hard metal such as stainless or mild steel, and for the cases shown in FIGS. 1 and 5 it could also be a tempered ceramic.

Between the disc 27 and the end of the cutting tool, are two holes 29 and 29a, which are aligned about an axis and which hold the multistranded line 30, which passes through from one opening to the other. In other modifications the tool may contain more than one pair of openings for the purpose of cutting several lines.

In operation, an electric current is passed through connecting wires 23 and 24, through bridge wire 21, which heats the explosive 22 causing ignition. The explosive force drives the sealing disc 25 and piston 26 against the compressed disc 27 which shears the line 30 at opening 29 and 29a, forcing a segment 31 of the line 30 into shoulder portion 37.

Figure 5:
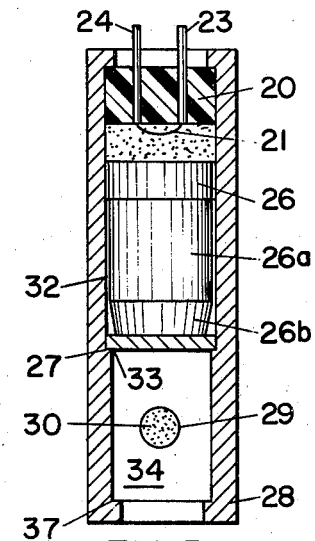
FIG. 5 shows a longitudinal midsectional view of another embodiment of the invention wherein the interdimension of the shearing section is slightly smaller than the disc dimension.
Figure 6:
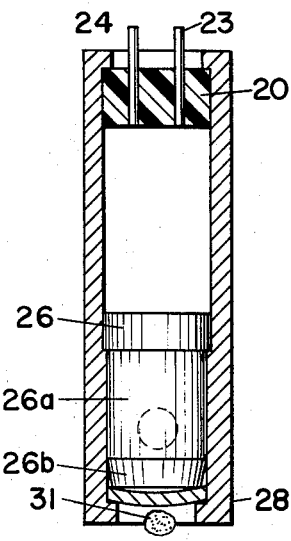
FIG. 6 is a view similar to that of FIG. 5 showing the shearing disc pressed against the side walls after firing.

With reference to FIGS. 5 and 6, the interior dimensions of the casing 28 are slightly smaller at the end section 34 between points 33 and 37 encompassing the openings 29 and 29a and provide a shoulder at 33 against which the disc 27 rests and which is held in place by piston 26, which has a narrow portion 26a which slides into the narrower interior section 34 and a chamfered end section 26b which acts to guide the piston into the narrower end section.

In operation, the embodiment of FIG. 5, when explosively activated, drives the piston into the narrower end section, carrying with it a compressed disc which is formed when the disc is passed over shoulder 33 into the narrower end section 34. The tight fit created thereby provides good shearing action for the line 30 at the intersections with openings 29 and 29a, and pushes a segment 31 of the line 30 into the end cavity as shown in FIG. 6.

In FIGS. 7 through 10 are shown still another embodiment of the present invention wherein the interior diameter encompassing the openings 29 and 29a provides a large shoulder 35 for piston 26 having a narrow portion 26a.

Figure 7:
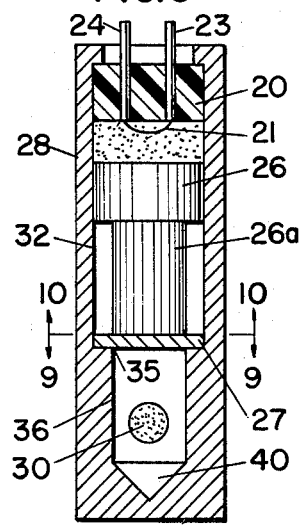
FIG. 7 is a longitudinal midsectional view of another embodiment of the line cutter of the invention in which a disc is punched by the movement of the piston.
Figure 8:
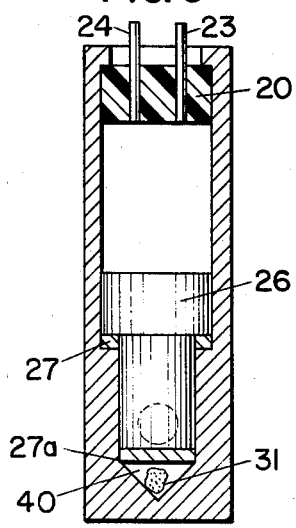
FIG. 8 is a view similar to that of FIG. 7 showing the embodiment of FIG. 7 after firing.
Figure 9:
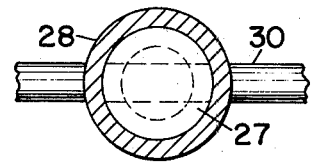
FIG. 9 is a transverse sectional view of the embodiment of FIG. 7 through section 9—9.
Figure 10:
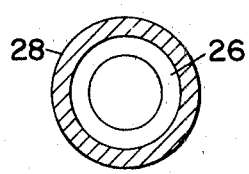
FIG. 10 is a transverse sectional view of the embodiment of FIG. 7 through section 10—10.

When the squib of the embodiment of FIG. 7 is ignited, the force developed thereby is sufficient to drive the piston 26 through disc 27 with such force that it inherently punches a compressed disc 27a into the cavity 36 such that a segment of the line 31 is forced into cavity 40 formed at the end of the cutting tool. Such an arrangement is particularly preferred where an intended use of the line cutter is at high pressures under water.

While the cutting tool of the present invention is primarily effective in cutting multistranded, very thin (0.001 inch thick) extrudable polymer or wire cables and lines, such as 750 pound test nylon parachute lines under no load conditions, that is lines which are not stressed, it is to be realized that the tool is also highly effective in cutting lines under tension. The tool can also be protected from exterior elements by proper sealing such that water leakage at high pressures can be prevented.

What is claimed is:

1. A line cutting tool comprising:
   a. a tubular casing having at least one pair of opposing openings through its walls for the insertion of a line therethrough,
   b. a moveable, tempered disc having contact with the interior walls of said casing,
   c. means for pushing said disc under compression to pass by said openings such that a line inserted through said openings is severed into three sections.

2. A line cutting tool of claim 1 wherein said means for forcing said disc under compression is a slideable piston within said casing having cross sectional dimensions similar to the interior cross section of said tubular casing.

3. A line cutting tool of claim 1 wherein,
   a. said tubular casing has at one end an electrically activated squib in gas tight relationship therewith, and wherein said pair of openings through the walls of said casing for the insertion of at least one line therethrough are located at the other end of said casing,
   b. said disc is compressed within the interior walls of said casing at a position between said squib and said pair of openings, and
   c. means for pushing said disc under compression to pass said openings is activated upon ignition of said squib.

4. A line cutting tool of claim 3 wherein said means for pushing said disc under compression is a piston having uniform cross section situated between said disc and said squib.

5. A cutting tool of claim 1 wherein,
   a. said tubular casing has an internal cross sectional dimension smaller over a linear section having at least one pair of opposing openings through its walls for the insertion of a line therethrough,
   b. a disc having contact with the interior walls of a larger interior section of said casing adjacent to the interior section thereof, and
   c. means for forcing said entire disc from said larger interior section into said smaller interior section to pass by said openings such that a line inserted therethrough is severed into three segments when said disc passes said openings.

6. A line cutting tool of claim 5 wherein said means for forcing said disc is a piston which is slideable into the section of hollow casing having the smaller cross sectional interior dimension.

7. A cutting tool of claim 6 wherein said section having smaller interior cross section is sufficiently small such that said piston shears a cross sectional segment of said disc under compression into said smaller cross sectional openings when forced into said smaller section.

* * * * *